United States Patent
Hamasaki

(10) Patent No.: US 8,203,292 B2
(45) Date of Patent: Jun. 19, 2012

(54) CONTROLLER OF MULTI-PHASE ELECTRIC MOTOR

(75) Inventor: Masamitsu Hamasaki, Kasugai (JP)

(73) Assignee: OMRON Corporation, Kyoto (JP)

( * ) Notice: Subject to any disclaimer, the term of this patent is extended or adjusted under 35 U.S.C. 154(b) by 693 days.

(21) Appl. No.: 12/276,948

(22) Filed: Nov. 24, 2008

(65) Prior Publication Data

US 2009/0146590 A1 Jun. 11, 2009

(30) Foreign Application Priority Data

Nov. 26, 2007 (JP) ................................ 2007-304090

(51) Int. Cl.
- *H02P 21/00* (2006.01)
- *H02P 6/16* (2006.01)
- *H02P 27/00* (2006.01)
- *G05B 11/28* (2006.01)
- *H02M 1/14* (2006.01)
- *H02H 5/04* (2006.01)
- *H02H 1/00* (2006.01)

(52) U.S. Cl. ......... 318/400.02; 318/400.04; 318/400.32; 318/599; 318/811; 363/41; 361/23; 361/131

(58) Field of Classification Search ............ 318/400.04, 318/400.02, 400.32, 599, 811; 363/41; 361/23, 361/131
See application file for complete search history.

(56) References Cited

U.S. PATENT DOCUMENTS

| | | | | |
|---|---|---|---|---|
| 4,691,269 A | * | 9/1987 | Yamane et al. ................ | 363/41 |
| 6,121,736 A | * | 9/2000 | Narazaki et al. ......... | 318/400.35 |
| 6,674,258 B2 | * | 1/2004 | Sakai et al. .............. | 318/400.28 |
| 6,724,166 B2 | * | 4/2004 | Narumi et al. ........... | 318/400.23 |
| 6,735,537 B2 | * | 5/2004 | Liu et al. .......................... | 702/64 |
| 6,914,409 B2 | * | 7/2005 | Nukushina .................... | 318/800 |
| 6,969,963 B2 | * | 11/2005 | Sakai et al. .............. | 318/400.27 |
| 7,049,778 B2 | * | 5/2006 | Katanaya ................. | 318/400.04 |
| 7,071,640 B2 | * | 7/2006 | Kurosawa et al. ....... | 318/400.04 |

(Continued)

FOREIGN PATENT DOCUMENTS

CN 1783698 A 6/2006

(Continued)

OTHER PUBLICATIONS

Office Action for Chinese Application No. 200810174060.X dated Dec. 14, 2010, 4 pages.

(Continued)

*Primary Examiner* — Walter Benson
*Assistant Examiner* — Gabriel Agared
(74) *Attorney, Agent, or Firm* — Osha • Liang LLP

(57) ABSTRACT

A controller of a multi-phase electric motor includes a drive section for driving the multi-phase electric motor; a single current detection section for detecting a current value of the multi-phase electric motor; a PWM signal generation section for generating plural PWM signals of each phase within one control period based on the current value detected by the current detection section and a carrier signal; and a phase movement section for moving a phase by a predetermined amount such that frequency in change of the PWM signal of the predetermined phase generated by the PWM signal generation section is included in a non-audible range, and outputting the PWM signal which phase is moved to the drive section; wherein the phase movement section moves the phase by a predetermined amount for all the PWM signals of the predetermined phase within one control period.

2 Claims, 15 Drawing Sheets

U.S. PATENT DOCUMENTS

| | | | |
|---|---|---|---|
| 7,102,322 B2 * | 9/2006 | Suzuki | 318/801 |
| 7,173,393 B2 | 2/2007 | Maeda et al. | |
| 7,193,388 B1 * | 3/2007 | Skinner et al. | 318/811 |
| 7,411,369 B2 | 8/2008 | Maeda et al. | |
| 7,671,557 B2 | 3/2010 | Maeda et al. | |
| 7,852,032 B2 * | 12/2010 | Azuma | 318/599 |
| 7,893,638 B2 * | 2/2011 | Akama et al. | 318/400.14 |
| 7,952,310 B2 * | 5/2011 | Hamasaki | 318/432 |
| 2005/0046369 A1 * | 3/2005 | Kobayashi et al. | 318/432 |
| 2009/0134822 A1 * | 5/2009 | Hamasaki et al. | 318/400.04 |

FOREIGN PATENT DOCUMENTS

| | | |
|---|---|---|
| JP | 63-073898 A | 4/1988 |
| JP | 2540140 B2 | 7/1996 |
| JP | 09-191508 A | 7/1997 |
| JP | 10-155278 A | 6/1998 |
| JP | 2001-095279 A | 4/2001 |
| JP | 2002291284 A | 10/2002 |
| JP | 2005-531270 A | 10/2005 |
| JP | 2007-112416 A | 5/2007 |

OTHER PUBLICATIONS

Office Action in Japanese Patent Application No. 2007-304090, Issued Sep. 20, 2011 (4 Pages with English Translation).

English Patent Abstract of JP 2002-291284, Publication Date: Oct. 4, 2002 (1 Page).

* cited by examiner

CONTROLLER OF MULTI-PHASE ELECTRIC MOTOR

BACKGROUND OF THE INVENTION

1. Technical Field

The present invention relates to a pulse width modulation (PWM) drive control of a multi-phase electric motor such as a three-phase brushless motor. In particular, the present invention relates to a noise prevention technique of a controller of a multi-phase electric motor arranged with a single current detector between a drive circuit for PWM driving and a direct current (DC) power supply (high voltage side or low voltage side).

2. Related Art

In a controller for driving a multi-phase electric motor such as a three-phase brushless motor, a PWM signal for determining ON/OFF timing of a switching element for driving the multi-phase electric motor is generated by comparing a carrier wave of saw-tooth shape or triangular shape (saw-tooth signal, triangular signal) and a duty set value corresponding to a target current value in each phase of the multi-phase electric motor. That is, whether the PWM signal is high level or low level is determined depending on whether a value (value of PWM counter) of the saw-tooth signal or the triangular signal is greater than or equal to, or smaller than a duty set value.

The time interval in time of switching between one phase and another phase sometimes becomes very small in the controller of the multi-phase electric motor for generating the PWM signal based on the saw-tooth signal and the triangular signal, and driving the multi-phase electric motor. In this time, since the current is not stable due to the switching time of an electric field effect transistor of the drive circuit, the presence of dead zone (dead time), and also the response delay of an electronic processing circuit, the measurement of an accurate current value by a current detector cannot be carried out during such a period.

For instance, when using an A/D converter for the current detector, an accurate current value cannot be detected unless a stable signal is continuously inputted for at least 2 μs according to the specification of the A/D converter. If the input signal is not stably inputted continuously for 2 μs, the AD converter cannot detect an accurate current value of each phase.

In a vehicle steering device described in Japanese Unexamined Patent Publication No. 2007-112416, a single current sensor for detecting the current value flowing through a current path is arranged on the current path between a motor drive circuit and a ground, and a phase of a saw-tooth wave for generating the PWM signal of each phase is shifted to shift the timing of fall of the PWM signal of each phase to the low level. A value of a U-phase current flowing through the electric motor is then obtained based on an output signal of the current sensor during a period in which a predetermined time has elapsed from when the PWM signal of a V phase fell to the low level. A total current value of the U-phase current and a V-phase current flowing through the electric motor is obtained based on an output signal of the current sensor during a period in which a predetermined time has elapsed from when the PWM signal of a W phase fell to the low level.

In a method of controlling a three-phase or multi-phase inverter described in Japanese Unexamined Patent Publication No. 10-155278, if the time interval between the switching of a transistor of one phase and the switching of a corresponding transistor of the next phase is smaller than a predetermined threshold value within a PWM period, the measurement is prohibited, the PWM signal defining the measurement time interval of sufficient duration is generated, and the influence of switching on a line current can be measured. The duration of the other PWM signals of the same dependent period is reduced by a certain value, and the sum of reduction of such other PWM signals is obtained to compensate for the amount of increase of the PWM signal defining the measurement interval.

A drive system for a three-phase brushless AC motor described in Japanese Unexamined Patent Publication No. 2005-531270 is configured to optimize a transistor switching pattern in order to enhance the power output while enabling the measurement of the current in all phases using a single sensor. This is realized by defining a voltage demand vector x in a case where three or more states are required to satisfy a minimum state time requirement determined by the single sensor method, and calculating the three or more state vectors for generating the request vector x while still allowing the single current detection.

In a method of monitoring a brushless motor capable of compensating some kind of drift in an output signal during a motor operation described in Japanese Unexamined Patent Publication No. 2001-95279, the current flowing into or flowing out from each winding of the motor is monitored and an output signal displaying the current is generated using a current measurement section, the output of the current measurement section is measured when an instantaneous current flowing through the current measurement section is known to be substantially zero, and a correction output signal for compensating some kind of difference between an actual measurement output signal value and an ideal output signal value is generated.

In U.S. Pat. No. 6,735,537, a triangular signal is used for a carrier wave, terms h phase, m phase, and l phase are used in place of the terms U phase, V phase, and W phase, where the time interval between the h phase and the m phase is represented as t1 and the time interval between the m phase and the l phase is represented as t2. As shown in FIG. 7 of U.S. Pat. No. 6,735,537, the process of Case 2 is performed when the time intervals t1, t2 are both smaller than a threshold value (mw). The process of Case 3 or Case 4 is performed when either one of the time intervals t1, t2 is smaller than the threshold value (mw). In the case of the process of Case 2 (see FIG. 13), the Duty maximum phase is shifted to the left side, and the Duty minimum phase is shifted to the right side (see FIG. 12B). If in the case of the process of Case 3 (see FIG. 15), and determined that only one phase needs to be shifted (N of step 148), the Duty maximum phase is shifted to the left side (see FIG. 14B). If in the case of the process of Case 4 (see FIG. 17), and determined that only one phase needs to be shifted (N of step 166), the Duty minimum phase is shifted to the left side (see FIG. 16B).

When the time interval in time of switching between one phase and another phase is small, the time interval in time of switching between one phase and another phase becomes large by performing a correction of shifting the phase of a predetermined phase, and an accurate current value of each phase of the multi-phase electric motor can be detected using the single current detector. However, if the frequency of the ON/OFF of the switching element for driving the multi-phase electric motor is included within an audible frequency, it is heard by the user as noise and gives the user an unpleasant feeling.

For instance, in the control method of Japanese Unexamined Patent Publication No. 10-155278, a control frequency and the corrected current ripple frequency are the same when the PWM signal is corrected. In the control method of Japanese Unexamined Patent Publication No. 10-155278, a control cycle time (period) is 400 µs, and thus the control frequency and the corrected current ripple frequency become 2.5 kHz. The current ripple is generated in time of switching by turning ON/OFF the switching element based on the corrected PWM signal. The frequency of the current ripple becomes the same as the control frequency, where if the relevant frequency is included in an audible range, it is heard by the user as noise and gives the user an unpleasant feeling. Humans are able to feel the sound normally from about 20 Hz to 15 kHz or from about 20 Hz to 20 kHz, which differs among individuals, and such frequency band is referred to as the audible range. That is, the noise is generated when having the control cycle time of between 50 µs and 50 ms. The following techniques are proposed to prevent such noise.

A motor drive device of an electric power steering described in Japanese Patent No. 2540140 assumes one switching element of each pair for conduction holding and the other switching element for high-speed switching of the switching elements of two pairs, and has the frequency of a pulse width modulation signal for high-speed switching higher than an audible frequency region, and thus the linearity of the output torque of the motor with respect to a steering torque can be enhanced by effectively utilizing a current continuation effect by a flywheel diode, and the generation of vibration sound can be prevented regardless of the switching by the pulse width modulation signal.

An inverter device described in Japanese Unexamined Patent Publication No. 63-73898 generates the PWM signal by comparing a modulation wave signal obtained by amplifying an error of a magnetic flux command signal of the frequency proportional to a frequency command from the outside and a motor voltage integration signal outputted by an integration circuit for integrating an inverter output voltage, and a triangular signal which is the carrier frequency of a non-audible frequency.

A controller of an electric vehicle described in Japanese Unexamined Patent Publication No. 9-191508 drives a motor with the power of a battery by PWM controlling an inverter arranged between a battery and a motor with a PWM control section, and normally sets the frequency of the PWM control section higher than an audible frequency to reduce the switching noise of the inverter. When a motor operation state detection section detects that the motor is in a low-speed, high-load operation state, and there is a possibility the switching element of the inverter may overheat, a frequency changing section lowers the frequency of the PWM control section to prevent damage by overheat of the switching element of the inverter.

However, there is not yet proposed a controller of a multi-phase electric motor capable of generating the PWM signal based on the saw-tooth signal or the triangular signal, and accurately detecting the current value of each phase for every control period using a signal current detection section, and having a sufficient noise prevention effect.

FIG. 15 shows a diagram showing the control method of Japanese Unexamined Patent Publication No. 10-155278 of the prior art, and is a timing chart in a case where two phases in one control period are not detectable. One control period is 400 µsec, and the configuration thereof is five periods of the PWM signal based on the saw-tooth signal of 80 µsec period. A case where the PWM signal of the U phase has a duty of 55%, the PWM signal of the V phase has a duty of 45%, and the PWM signal of the W phase has a duty of 50% is shown. Since the time intervals between the V phase of duty minimum phase and the W phase of intermediate phase, and between the W phase of intermediate phase and the U phase of maximum phase are both 5%, that is, short, the switching noise cannot be accommodated as shown in the shunt waveform (waveform of the voltage generated at both ends of the current detection shunt resistor) of the relevant period, and an A/D conversion time for accurately detecting the current value cannot be ensured, and thus the phase of the PWM signal of the V phase of minimum phase is made short and the phase of the PWM signal of the U phase of maximum phase is made long in the first period.

The switching time intervals between the V phase and the W phase, and between the U phase and the W phase thus become large, and the accurate current value of the V phase is detected in a measurement period U2, and of the U phase is detected in a measurement period U1. In the second to the fifth periods, the phase of the PWM signal of the V phase of minimum phase is made long (compensation period U2) and the phase of the PWM signal of the U phase of maximum phase is made short (compensation period U1) to compensate for the amount of change of the phase in the first period.

FIG. 16 shows a diagram showing the control method of Japanese Unexamined Patent Publication No. 10-155278 of the prior art, and is a timing chart in a case where two phases in three control periods are not detectable. As shown in FIGS. 15 and 16, the period of the current ripple within the first period represented in the shunt waveform in each control period is the same as the control cycle time 400 µsec of one control period, and the frequency corresponding to such a period is in the audible range. Therefore, the noise generates.

SUMMARY

One or more embodiments of the present invention provides a controller of a multi-phase electric motor capable of accurately detecting the current value of each phase for every control period using a single current detection section, and preventing the generation of noise arising from a current ripple by switching based on a PWM signal.

A controller of a multi-phase electric motor according to one or more embodiments of the present invention includes a drive section, including a pair of an upper arm switching element and a lower arm switching element, for driving the multi-phase electric motor; a single current detection section for detecting a current value of the multi-phase electric motor; a PWM signal generation section for generating plural PWM signals of each phase within one control period based on the current value detected by the current detection section and a carrier signal; a current detectability determination section for determining whether or not the current value is detectable in the current detection section based on the PWM signal of each phase generated by the PWM signal generation section; and a phase movement section for moving a phase of the PWM signal of a predetermined phase generated by the PWM signal generation section by a predetermined amount when the current detectability determination section determines that current is not detectable.

Thus, the current value of each phase can be accurately detected for every control period using the single current detection section, and the phase movement section moves the phase of the PWM signal of the predetermined phase by a predetermined amount when the current is not detectable, and thus the generation of noise can be prevented in such a manner that the frequency of the current ripple by switching based on the PWM signal is not included in the audible range by such movement.

According to one or more embodiments of the present invention, in the controller of the multi-phase electric motor, the phase movement section may move the phase by a predetermined amount for all the PWM signals of the predetermined phase in one control period.

The one control period is normally a few hundred μsec., one control period is configured by few PWM signals, and the control cycle time is a few dozen μsec, and thus the frequency of the current ripple by switching becomes a frequency higher than the audible frequency region, and thus is not included in the audible range, whereby the generation of noise can be prevented.

According to one or more embodiments of the present invention, the controller of the multi-phase electric motor further includes a switching number determination section for determining whether or not number of the upper arm switching element to turn ON is an even number or an odd number when the current detectability determination section determines that current is not detectable, wherein the phase movement section may move the phase of the PWM signal of the predetermined phase generated by the PWM signal generation section by a predetermined amount based on the determination result of the switching number determination section.

Therefore, the generation of noise can be prevented, and furthermore, the current value of each phase can be accurately detected for every control period using the single current detection section without changing the duty of each phase even if the time interval of the switching between a predetermined phase and another phase is originally short to an extent the current value cannot be detected since the time interval of the switching between the predetermined phase in which the phase is moved and another phase becomes large, and the current value can be detected with the current value of the moved predetermined phase stabilized.

One or more embodiments of the present invention may adopt a configuration of including a drive section, including a pair of an upper arm switching element and a lower arm switching element, for driving the multi-phase electric motor; a single current detection section for detecting a current value of the multi-phase electric motor; a PWM signal generation section for generating plural PWM signals of each phase within one control period based on the current value detected by the current detection section and a carrier signal; and a phase movement section for moving a phase of the PWM signal by a predetermined amount such that frequency in change of the PWM signal of the predetermined phase generated by the PWM signal generation section is included in a non-audible range.

Thus, the current value of each phase can be accurately detected for every control period using the single current detection section, and the generation of noise can be prevented as the frequency of the current ripple by switching based on the PWM signal is not included in the audible range since the phase movement section moves the phase such that the frequency of change of the PWM signal of the predetermined phase is included in the non-audible range.

According to the controller of the multi-phase electric motor according to one or more embodiments of the present invention, the current value of each phase can be accurately detected for every control period using the single current detection section, and the generation of noise can be prevented by causing the phase movement section to move the phase of the PWM signal of the predetermined phase by a predetermined amount such that the frequency of the current ripple by switching based on the PWM signal is not included in the audible range.

DETAILED DESCRIPTION

Embodiments of the present invention will be described below with reference to the drawings.

Figure 1:
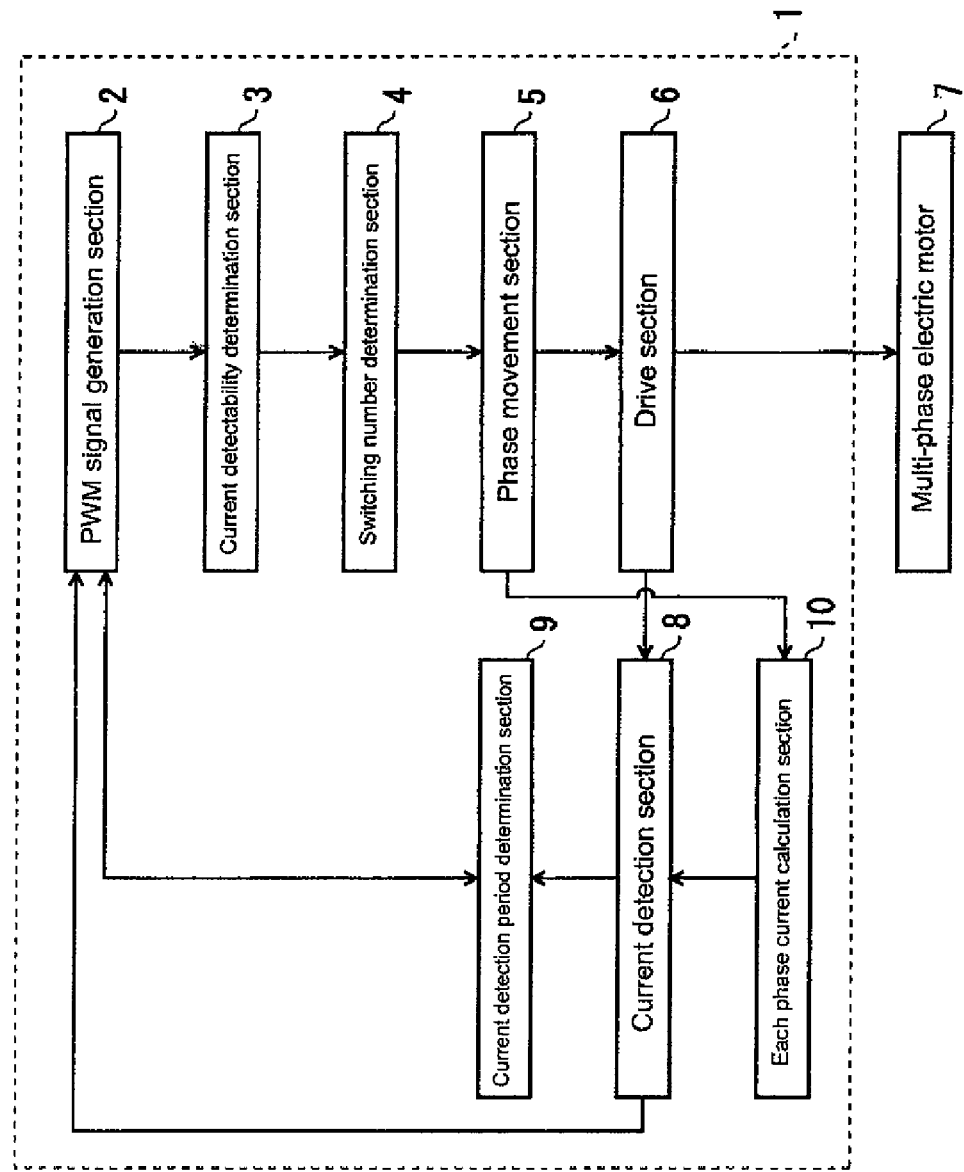
FIG. 1 shows a block diagram of a controller of a multi-phase electric motor according to an embodiment of the present invention.

FIG. 1 shows a block diagram of a controller of a multi-phase electric motor according to an embodiment of the present invention. A controller 1 of a multi-phase electric motor 7 according to the embodiment of the present invention has the following configuration. A drive section 6 is connected between a power supply and a ground, as hereinafter described in the description of a circuit diagram of FIG. 2, includes a pair of upper arm switching elements Q1 to Q3 and lower arm switching elements Q4 to Q6, and drives the multi-phase electric motor 7. A current detection section 8 is connected between the drive section 6 and a ground, and detects a current value flowing to the multi-phase electric motor 7 at a predetermined time. A PWM signal generation section 2 generates PWM signal of each phase based on the current value detected in the current detection section 8 and the saw-tooth signal having a predetermined frequency. A current detectability determination section 3 determines whether or not the current value is detectable in the current detection section 8, that is, whether or not there is a switching time interval for the accurate current value to be detected in the current detection section 8 based on the PWM signal of each phase generated in the PWM signal generation section 2. A switching number determination section 4 determines whether or not the number of switching elements turned ON of the three upper arm switching elements Q1 to Q3 is an even number when the current detectability determination section 3 determines that the current is not detectable. A phase movement section 5 advances or delays the phase of the PWM signal of the predetermined phase generated by the PWM signal generation section 2 by a predetermined amount based on the determination result of the switching number determination section 4, and outputs the PWM signal which phase is moved to the drive section 6. A current detection period determination section 10 determines a current detection start timing and a current detection period by the current detection section 8 based on a fall time of the PWM signal of each phase determined in the phase movement section 5. Each phase current calculation section 9 calculates the current value of the remaining phase that cannot be directly detected based on the current value detected in the current detection section 8 and the PWM signal generated in the PWM signal generation section 2.

Figure 2:
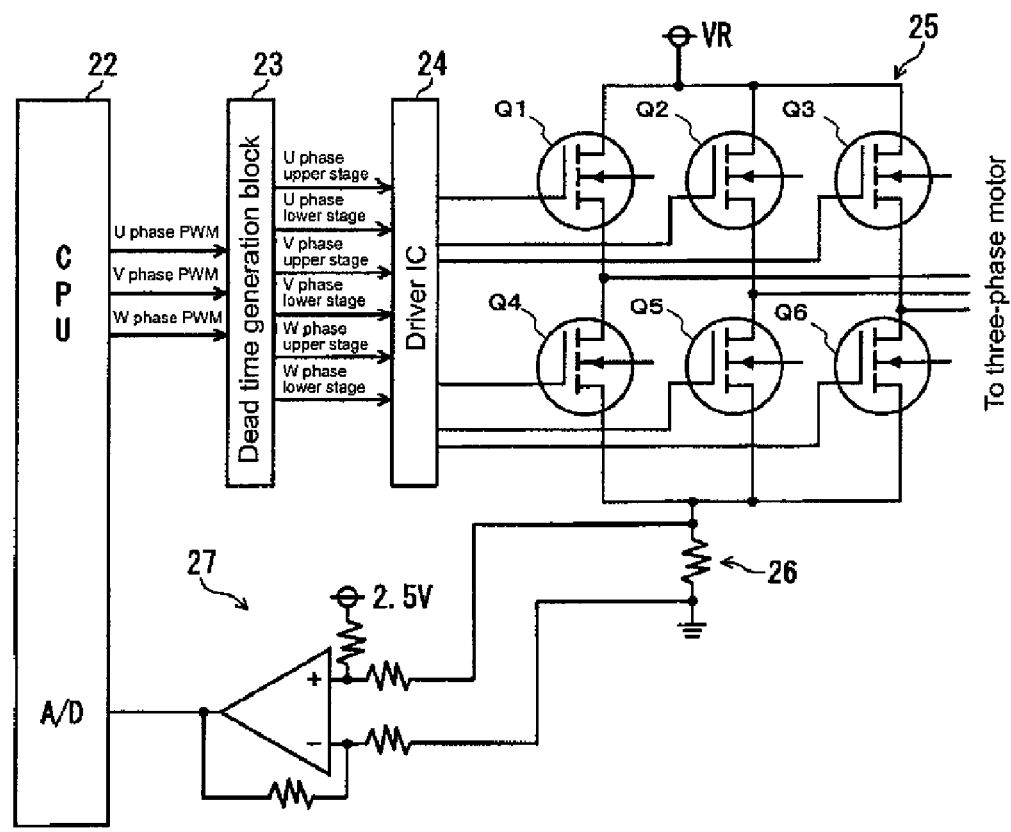
FIG. 2 shows a circuit diagram of the controller of the multi-phase electric motor according to the embodiment of the present invention.

FIG. 2 shows a circuit diagram of the controller 1 of the multi-phase electric motor according to the embodiment of the present invention. A CPU 22 outputs each PWM signal of the U phase upper stage, the V phase upper stage, and the W phase upper stage to a dead time generation block 23. The dead time generation block 23 inputs such signals, provides a slight time interval in which the signals for the upper arm switching elements Q1 to Q3 and the lower arm switching elements Q4 to Q6 of each phase are turned OFF such that the signals for the upper arm switching elements Q1 to Q3 and the lower arm switching elements Q4 to Q6 of each phase both are not turned ON for circuit protection, generates each PWM signal of the U phase upper stage, the U phase lower stage, the V phase upper stage, the V phase lower stage, the W phase upper stage, and the W phase lower stage and outputs the PWM signals to a driver IC 24. The function of the dead time generation block 23 may be realized by software in the CPU 22.

The driver IC 24 inputs such signals to control an FET bridge 25. The FET bridge 25 is connected between a power supply VR and the ground, and includes three pairs of the upper arm switching elements Q1 to Q3 and the lower arm switching elements Q4 to Q6. An intermediate part of the three pairs of the upper arm switching elements Q1 to Q3 and the lower arm switching elements Q4 to Q6 is connected to each phase of the three-phase electric motor. A single shunt resistor 26 is connected between the FET bridge 25 and the ground. The voltage over both ends of the shunt resistor 26 is inputted to an A/D conversion port of the CPU 22 via a current detection circuit 27 including an operational amplifier, a resistor, and the like.

The basic function of the present circuit is as described below. The phase current detection period is 250 μsec, the detection method is two-phase detection/one-phase estimation method, and the PWM mode is a saw-tooth PWM.

In the configuration of FIG. 2, the CPU 22 configures the current detectability determination section 3, the switching number determination section 4, the phase movement section 5, each phase current calculation section 9, and the current detection period determination section 10 in FIG. 1, the CPU 22 and the dead time generation block 23 configure the PWM signal generation section 2 in FIG. 1, the FET bridge 25 configures the drive section 6 in FIG. 1, and the shunt resistor 26 and the current detection circuit 27 configure the current detection section 8 in FIG. 1. In the present embodiment, the three-phase electric motor is used for the multi-phase electric motor 7 of FIG. 1. The three-phase electric motor is a brushless motor used in an electrical power steering device of the vehicle, and the like.

Figure 3:
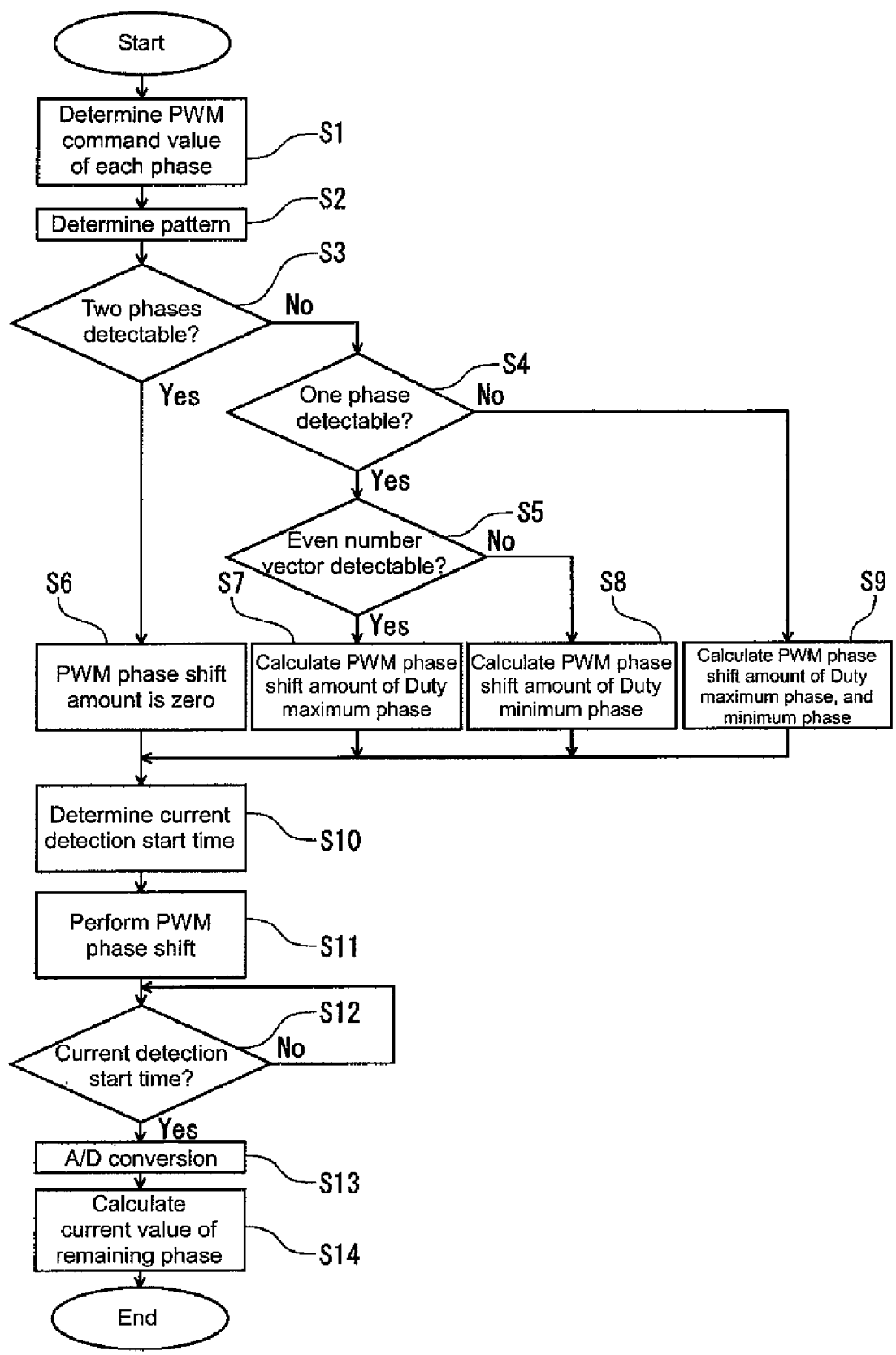
FIG. 3 shows a flowchart of the controller of the multi-phase electric motor according to the embodiment of the present invention.

FIG. 3 shows a flowchart of the controller 1 of the multi-phase electric motor according to the embodiment of the present invention. First, the PWM signal generation section 2 determines a PWM command value of each phase of U, V, and W (S1). As the details will be hereinafter described, pattern determination is performed based on the duty of each phase of U, V, and W (S2). The separation of cases of detectability by the current detectability determination section 3 is then carried out (S3 to S5). First, whether or not two phases of the three phases are detectable is determined (S3). If two phases are not detectable (No in S3), whether or not one phase of the three phases is detectable is determined (S4). If one phase is detectable (Yes in S4), the switching number determination section 4 determines whether an even number vector is detectable (S5). If the even number vector is not detectable (No in S5), an odd number vector is detectable. The even number vector and the odd number vector will be hereinafter described. With respect to a certain phase, the current detection on such a phase is possible if there is a switching time enough for an accurate current value to be detected in the CPU 22.

The phase movement section 5 then calculates the phase that requires movement and the necessary amount of shift based on the detectability determination condition. First, if two phases are detectable (Yes in S3), the movement is not necessary, and the phase shift amount of each phase of PWM may be zero (S6). If only the even number vector is detectable (Yes in S5), the phase of the phase having a maximum duty is delayed, and the shift amount thereof is calculated (S7). If only the odd number vector is detectable (No in S5), the phase of the phase having a minimum duty is advanced, and the shift amount thereof is calculated (S8). If no phase is detectable (No in S4), the phase of the phase having a maximum duty and the phase of the phase having a minimum duty are both shifted, and the respective shift amount are calculated (S9).

The current detection period determination section 10 determines the current detection start timing by the current detection section 8 based on the fall time of the PWM signal of each phase determined by the phase movement section 5 (S10). The current detection start timing will be hereinafter described in detail. The phase movement section 5 performs the PWM phase shift of each phase by the calculated shift amount (S11). In the case of no PWM phase shift (S6), the phase shift amount is zero. When the current detection start timing of two locations, to be hereinafter described, is reached (Yes in S12), the current detection section 8 starts the A/D conversion (S13). The switching of each phase is not carried out during the A/D conversion period, and the PWM signal of a predetermined phase falls at the time point where the time necessary for the A/D conversion has elapsed. After the current detection section 8 detects the current of two phases in such a manner, the each phase current calculation section 9 calculates the current value of the remaining one phase that is not detected based on the Kirchhoff's Law (total of three currents flowing to the three-phase electric motor is zero. In other words, Iu+Iv+Iw=0 where Iu: U phase current, Iv: V phase current, Iw: W phase current) (S14).

Table 1 is a table showing PWM pattern determination condition, detectable vector, detected current, and A/D conversion timing. Here, w_pwmU, w_pwmV, and w_pwmW respectively show the duty ratio of the command value of the U phase, the V phase, and the W phase. These are categorized into six patterns depending on the magnitude relation of the duty ratios of the three phases. For example, in a case of w_pwmU≧w_pwmW≧w_pwmV, the pattern is pattern 3 of table 1. In each pattern, the following four cases are considered. In other words, (1) when two phases are detectable
(2) when only odd number vector is detectable (3) when only even number vector is detectable
(4) when both two phases are not detectable

TABLE 1

| Pattern | Pattern determination | Detectable vector | Detected current | AD conversion start time |
|---|---|---|---|---|
| 1 | w_pwmV >= w_pwmU >= w_pwmW | (0, 1, 0) Odd | V | V phase upper stage OFF |
| | | (1, 1, 0) Even | −W | U phase upper stage OFF |
| 2 | w_pwmU >= w_pwmV >= w_pwmW | (1, 0, 0) Odd | U | U phase upper stage OFF |
| | | (1, 1, 0) Even | −W | V phase upper stage OFF |
| 3 | w_pwmU >= w_pwmW >= w_pwmV | (1, 0, 0) Odd | U | U phase upper stage OFF |
| | | (1, 0, 1) Even | −V | W phase upper stage OFF |
| 4 | W_pwmW >= w_pwmU >= w_pwmV | (0, 0, 1) Odd | W | W phase upper stage OFF |
| | | (1, 0, 1) Even | −V | U phase upper stage OFF |
| 5 | w_pwmW >= w_pwmV >= w_pwmU | (0, 0, 1) Odd | W | W phase upper stage OFF |
| | | (0, 1, 1) Even | −U | V phase upper stage OFF |
| 6 | w_pwmV >= w_pwmW >= w_pwmU | (0, 1, 0) Odd | V | V phase upper stage OFF |
| | | (0, 1, 1) Even | −U | W phase upper stage OFF |

The vector represents the ON, OFF of the upper arm switching element in the order of U phase, V phase, and W phase in correspondence to 1 and 0, respectively. The odd number vector is a vector in which the number of 1 is an odd number, that is, the number of elements to turn ON of the upper arm switching elements is an odd number. The even number vector is a vector in which the number of 1 is an even number, that is, the number of elements to turn ON of the upper arm switching elements is an even number.

For example, a case of detecting the odd number vector in pattern 3 is a case of detecting the U phase of the three phases, and the detectable vector is (1, 0, 0). This vector represents a state in which the U phase of the upper arm switching elements Q1 to Q3 is ON in a first element (1), the V phase is OFF in a second element (0), and the W phase is OFF in a third element (0), where the number of switching element that is turned ON (1) of the three elements is only one, and thus is an odd number vector. The detectability determination condition in this case is (w_pwmU)−(w_pwmW)≧12% when the minimum time necessary for performing the A/D conversion within a period in which the current value is stable is 12% of the 50 μsec period, and the detectable timing (AD conversion start time in table 1) sets the timing to turn OFF the U phase upper stage as the reference. That is, in view of the time necessary for A/D conversion, the end time of the A/D conversion matches the timing to turn OFF the U phase upper stage by starting the A/D conversion at the timing of the time necessary for A/D conversion before the timing to turn OFF the U phase upper stage, and thus this is the optimum timing at which the current value stabilizes.

A case of detecting the even number vector in pattern 3 is a case of detecting the V phase (opposite polarity), and the detectable vector is (1, 0, 1). This vector represents a state in which the U phase of the upper arm switching elements Q1 to Q3 is ON in a first element (1), the V phase is OFF in a second element (0), and the W phase is ON in a third element (1), where the number of switching element that is turned ON (1) of the three elements is two, and thus is an even number vector. The detectability determination condition in this case is (w_pwmW)−(w_pwmV)≧12%, and the detectable timing (AD conversion start time) sets the timing to turn OFF the W phase upper stage as the reference. That is, in view of the time necessary for A/D conversion, the end time of the A/D conversion matches the timing to turn OFF the W phase upper stage by starting the A/D conversion at the timing of the time necessary for AND conversion before the timing to turn OFF the W phase upper stage which is the duty intermediate phase, and thus this is the optimum timing at which the current value stabilizes. Similar concept can be applied to other patterns, and thus the description other than pattern 3 will not be given.

If sufficient detection time (e.g., MIN_DUTY=12%) of the current value by the A/D converter cannot be ensured, and an accurate current value cannot be detected since the current value is not stable, the phase is shifted in the following manner for each PWM input signal of the driver IC during the control period (50 μsec×5 periods). When two phases are detectable, the PWM phase shift is not necessary.

Table 2 is a table showing a case where only the even number vector is detectable. If only the even number vector is detectable, the shift is performed as in table 2 to ensure a detectable time in which the current values for the two phases stabilize. That is, only the Duty maximum phase is shifted to the right side (side for delaying the phase) by the shift amount of MIN_DUTY (12%)−(maximum phase Duty %−intermediate phase Duty %). The shift is not made for the Duty intermediate phase and the Duty minimum phase.

TABLE 2

| Phase | Shift amount | Direction |
|---|---|---|
| Duty maximum phase | MIN_DUTY (12%) - (maximum phase Duty % − intermediate phase Duty %) | Right side |
| Duty intermediate phase | No shift | |
| Duty minimum phase | No shift | |

Table 3 is a table showing a case where only the odd number vector is detectable. If only the odd number vector is detectable, the shift is performed as in table 3 to ensure a detectable time in which the current value stabilizes for the two phases. That is, only the Duty minimum phase is shifted to the left side (side for advancing the phase) by the shift amount of MIN_DUTY (12%)−(intermediate phase Duty %−minimum phase Duty %). The shift is not made for the Duty maximum phase and the Duty intermediate phase.

TABLE 3

| Phase | Shift amount | Direction |
|---|---|---|
| Duty maximum phase | No shift | |
| Duty intermediate phase | No shift | |
| Duty minimum phase | MIN_DUTY (12%) - (intermediate phase Duty % − minimum phase Duty %) | Left side |

Table 4 is a table showing a case where two phases are both not detectable. If two phases are both not detectable, the shift is performed as in table 4 to ensure a detectable time in which the current value stabilizes for the two phases. That is, the Duty maximum phase is shifted to the right side (side for delaying the phase) by the shift amount of MIN_DUTY (12%)−(maximum phase Duty %−intermediate phase Duty %). Furthermore, the Duty minimum phase is shifted to the left side (side for advancing the phase) by the shift amount of MIN_DUTY (12%)−(intermediate phase Duty %−minimum phase Duty %). The shift is not made for the Duty intermediate phase.

TABLE 4

| Phase | Shift amount | Direction |
|---|---|---|
| Duty maximum phase | MIN_DUTY (12%) - (maximum phase Duty % − intermediate phase Duty %) | Right side |
| Duty intermediate phase | No shift | |
| Duty minimum phase | MIN_DUTY (12%) - (intermediate phase Duty % − minimum phase Duty %) | Left side |

Figure 4:
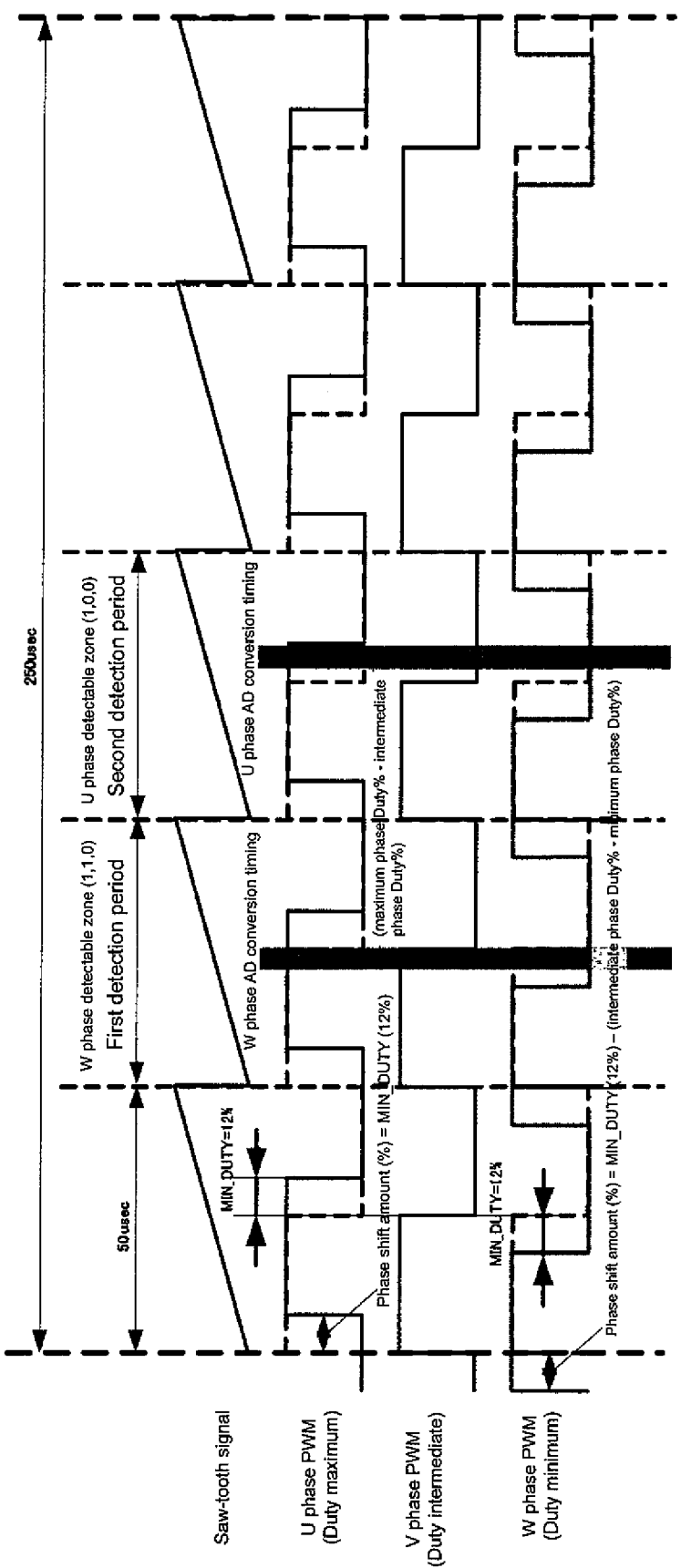
FIG. 4 shows a timing chart showing a brief overview of the controller of the multi-phase electric motor according to the embodiment of the present invention.

FIG. 4 shows a timing chart showing a brief overview of the controller of the multi-phase electric motor according to the embodiment of the present invention. The details will be described in FIG. 5 and subsequent figures.

The control period is 250 μsec, and the configuration thereof includes five periods of PWM signal based on the saw-tooth signal of 50 μsec period. Here, the A/D conversion is performed aiming at the time of the timing in which the current value can be detected in the second and the third PWM period. Hereinafter, the second PWM period is noted as a first detection period, and the third PWM period is noted as a second detection period. In this example, the detection is performed in the even number vector state (1, 1, 0) in the first detection period, and the detection is performed in the odd number vector state (1, 0, 0) in the second detection period, but either detection may be performed in either period, or both detections may be performed in the same period.

In the figure, the duties of the three phases are close to each other, where the duty is the maximum in the U phase, the intermediate in the V phase, and the minimum in the W phase. At the current detection timing (AD conversion timing) of the W phase, the U phase takes a high state, the V phase takes a high state, and the W phase takes a low state, and the vector of the switching elements is (1, 1, 0). In other words, the number of switching elements to turn ON in the upper arm switching elements is an even number. In this case, the current value of the W phase should be detectable without shifting if the switching time interval between the V phase and the W phase is a sufficient length necessary for AD conversion. However, the accurate current value of the W phase cannot be detected if the time interval between the V phase and the W phase is small.

At the current detection timing (AD conversion timing) of the U phase, the U phase takes a high state, the V phase takes a low state, and the W phase takes a low state, and the vector of the switching elements is (1, 0, 0). In other words, the number of switching elements to turn ON in the upper arm switching elements is an odd number. In this case, the current value of the U phase should be detectable without shifting if the switching time interval between the U phase and the V phase is a sufficient length necessary for A/D conversion. However, the accurate current value of the U phase cannot be detected if the time interval between the U phase and the V phase is small.

As shown with a solid line, the Duty maximum U phase is shifted to the right side (i.e., delay the phase) by the shift amount of MIN_DUTY (12%)−(maximum phase Duty %−intermediate phase Duty %) to ensure the phase difference 12% for detecting the accurate current value at the respective timing. The Duty minimum W phase is shifted to the left side (i.e., advance the phase) by the shift amount of MIN_DUTY (12%)−(intermediate phase Duty %−minimum phase Duty %). The broken line in the U phase and the W phase shows the PWM signal of each phase before shifting. The Duty intermediate V phase is not shifted. Similar shift process is performed in the five periods.

The A/D conversion is performed at an optimum location of the detectable timing at when the current of two phases of the U phase, which is the Duty maximum phase, and the W phase, which is the Duty minimum phase, can be detected. That is, in the case of the current detection of the Duty minimum W phase, the period necessary for A/D conversion immediately before the fall of the PWM signal of the Duty intermediate V phase after the fall of the PWM signal of the W phase during the first detection period is the current detection period (shaded portion on the left side). In the case of the current detection of the Duty maximum U phase, the period necessary for AD conversion immediately before the fall of the PWM signal of the U phase after the fall of the PWM signal of the V phase during the second detection period is the current detection period (shaded portion on the right side).

Figure 5:
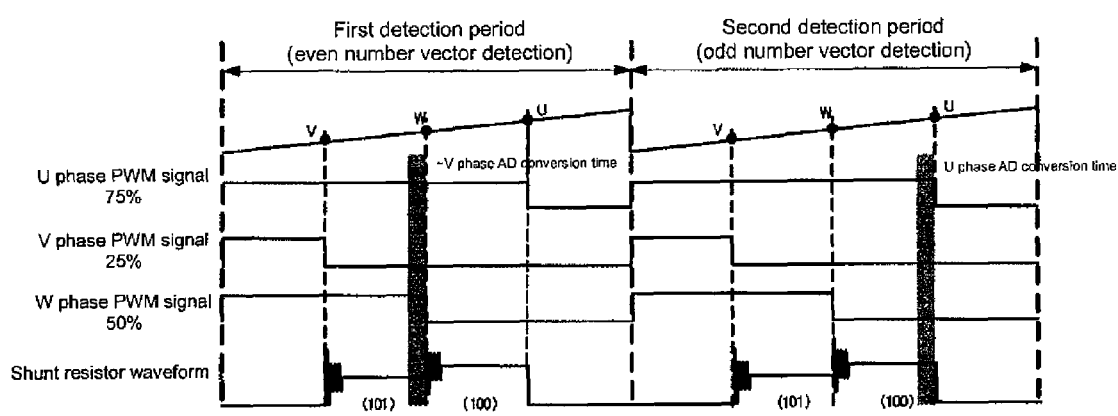
FIG. 5 shows a timing chart in a case where two phases are both detectable.

FIG. 5 shows a timing chart in a case where the two phases are both detectable. In the first detection period (even number vector detection period), the switching time interval between the V phase (duty 25%) and the W phase (50%) is sufficiently large. Thus, an accurate current value can be detected in such a time interval (vector in this case is (1, 0, 1)). In the second detection period (odd number vector detection period), the switching time interval between the U phase (75%) and the W phase (50%) is large. Thus, an accurate current value can also be detected in such a time interval (vector in this case is (1, 0, 0)). Therefore, shift does not need to be performed. The shunt resistor waveform in the figure represents the voltage waveform at both ends of the shunt resistor 26 (same below).

The A/D conversion is performed at the optimum location of the detectable timing at when the current of two phases of the U phase, which is the Duty maximum phase, and the W phase, which is the Duty minimum phase, can be detected. That is, in the case of the current detection of the Duty minimum V phase, the A/D conversion is performed in a period necessary for A/D conversion immediately before the fall of the PWM signal of the W phase which is the Duty intermediate phase during the first detection period (shaded portion on the left side). In the case of the current detection of the Duty maximum U phase, the A/D conversion is performed in the period necessary for A/D conversion immediately before the fall of the PWM signal of the U phase during the second detection period (shaded portion on the right side).

Figure 6A:
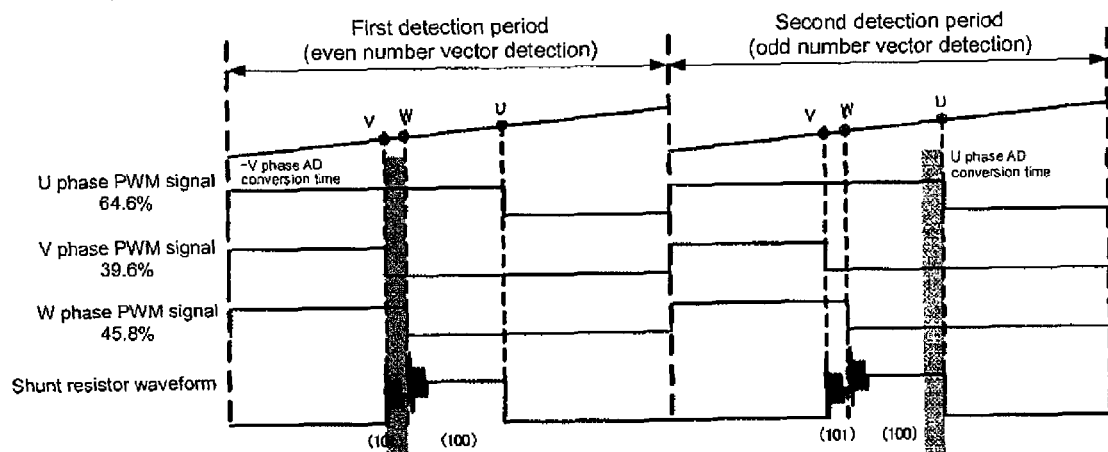
FIGS. 6A and 6B show timing charts in a case where only an odd number vector is detectable.

FIG. 6A shows a timing chart in a case where only the odd number vector is detectable. In the first detection period (even number vector detection period), the switching time interval between the V phase (duty 39.6%) and the W phase (45.8%) is small. Thus, an accurate current value of the V phase cannot be detected in such a time interval. In the second detection period (odd number vector detection period), the switching time interval between the U phase (64.6%) and the W phase (45.8%) is large. Thus, an accurate current value of the U phase can be detected in such a time interval.

Figure 6B:
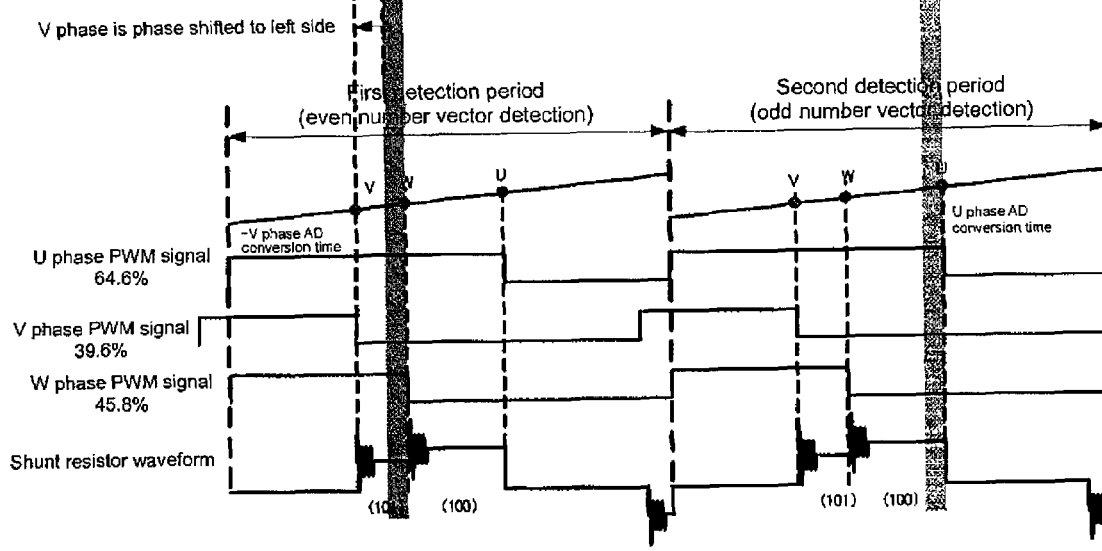

In other words, in the first detection period (even number vector detection period), the PWM signal of the V phase having the minimum duty of the three phases is phase shifted to the left side (to advance the phase) as shown in FIG. 6B since an accurate current value of the V phase cannot be detected in a state of even number vector, that is, in a state of (1, 0, 1) in this case. The switching time interval between the V phase and the W phase thereby becomes large. The accurate current value of the V phase then can be detected in the A/D converter since the current value stabilizes. In the second detection period (odd number vector detection period), the switching time interval between the U phase and the W phase is large even after the phase shift of the V phase. Thus, an accurate current value of the U phase can be detected in such a time interval.

In the case of the current detection of the Duty minimum V phase the A/D conversion is performed in a period necessary for A/D conversion immediately before the fall of the PWM signal of the W phase which is the Duty intermediate phase after the fall of the PWM signal of the V phase during the first detection period (shaded portion on the left side). In the case of the current detection of the Duty maximum U phase, the A/D conversion is performed in the period necessary for A/D conversion immediately before the fall of the PWM signal of the U phase after the fall of the PWM signal of the W phase during the second detection period (shaded portion on the right side).

Figure 7A:
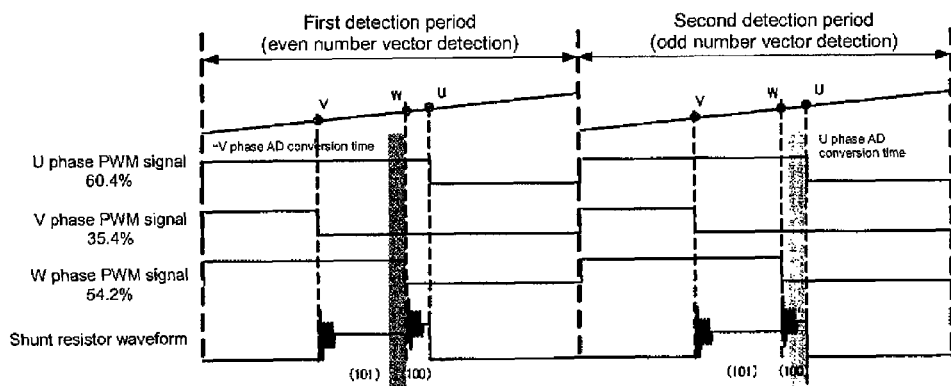
FIGS. 7A and 7B show timing charts in a case where only an even number vector is detectable.

FIG. 7A shows a timing chart in a case where only the even number vector is detectable. In the first detection period (even number vector detection period), the switching time interval between the V phase (duty 35.4%) and the W phase (54.2%) is large. Thus, an accurate current value of the V phase can be detected in such a time interval. In the second detection period (odd number vector detection period), the switching time interval between the U phase (60.4%) and the W phase (54.2%) is small. Thus, an accurate current value of the U phase cannot be detected in such a time interval.

Figure 7B:
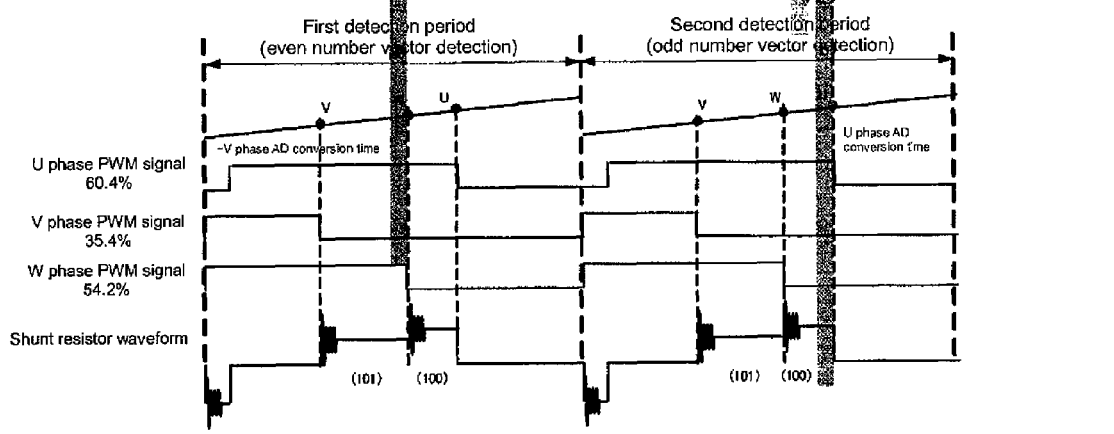

In other words, the PWM signal of the U phase having the maximum duty of the three phases is phase shifted to the right side (to delay the phase) as shown in FIG. 7B since an accurate current value of the U phase cannot be detected in a state of odd number vector, that is, in a state of (1, 0, 0) in this case. The switching time interval between the U phase and the W phase thereby becomes large. The accurate current value of the U phase then can be detected. In the first detection period (even number vector detection period), the switching time interval between the V phase and the W phase is large even after the phase shift of the U phase. Thus, an accurate current value of the V phase can be detected in such a time interval.

In the case of the current detection of the Duty minimum V phase, the A/D conversion is performed in a period necessary for A/D conversion immediately before the fall of the PWM signal of the W phase which is the Duty intermediate phase after the fall of the PWM signal of the V phase during the first detection period (shaded portion on the left side). In the case of the current detection of the Duty maximum U phase, the A/D conversion is performed in the period necessary for A/D conversion immediately before the fall of the PWM signal of the U phase after the fall of the PWM signal of the W phase during the second detection period (shaded portion on the right side).

Figure 8A:
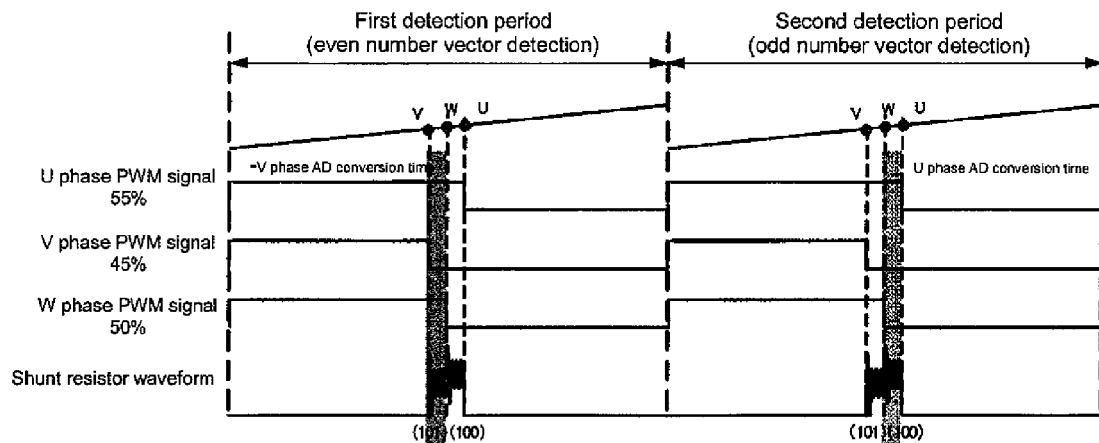
FIGS. 8A and 8B show timing charts in a case where two phases are not detectable.

FIG. 8A shows a timing chart in a case where two phases are not detectable. In the first detection period (even number vector detection period), the switching time interval between the V phase (duty 45%) and the W phase (50%) is small. Thus, an accurate current value of the V phase cannot be detected in such a time interval. In the second detection period (odd number vector detection period), the switching time interval between the U phase (55%) and the W phase (50%) is also small. Thus, an accurate current value of the U phase cannot be detected in such a time interval.

Figure 8B:
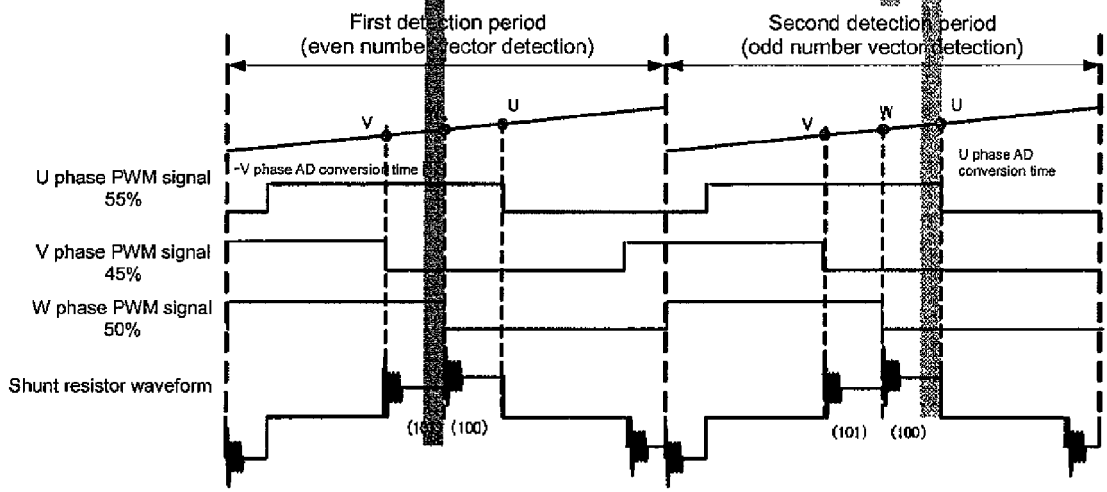

In other words, in the first detection period (even number vector detection period) of FIG. 8A, the PWM signal of the V phase having the minimum duty is phase shifted to the left side (to advance the phase) as shown in FIG. 8B since an accurate current value of the V phase cannot be detected in the state of even number vector, that is, in a state of (1, 0, 1) in this case. The switching time interval between the V phase and the W phase thereby becomes large. In the second detection period (odd number vector detection period) of FIG. 8A, the PWM signal of the U phase having the maximum duty is phase shifted to the right side (to delay the phase) as shown in FIG. 8B since an accurate current value of the U phase cannot be detected in the state of odd number vector, that is, in a state of (1, 0, 0) in this case. The switching time interval between the U phase and the W phase thereby becomes large. Therefore, the accurate current values of the U phase and the V phase can be eventually detected.

In the case of the current detection of the Duty minimum V phase, the A/D conversion is performed in a period necessary for A/D conversion immediately before the fall of the PWM signal of the Duty intermediate W phase after the fall of the PWM signal of the V phase during the first detection period (shaded portion on the left side). In the case of the current detection of the Duty maximum U phase, the A/D conversion is performed in the period necessary for AD conversion immediately before the fall of the PWM signal of the U phase after the fall of the PWM signal of the W phase during the second detection period (shaded portion on the right side).

Figure 9:
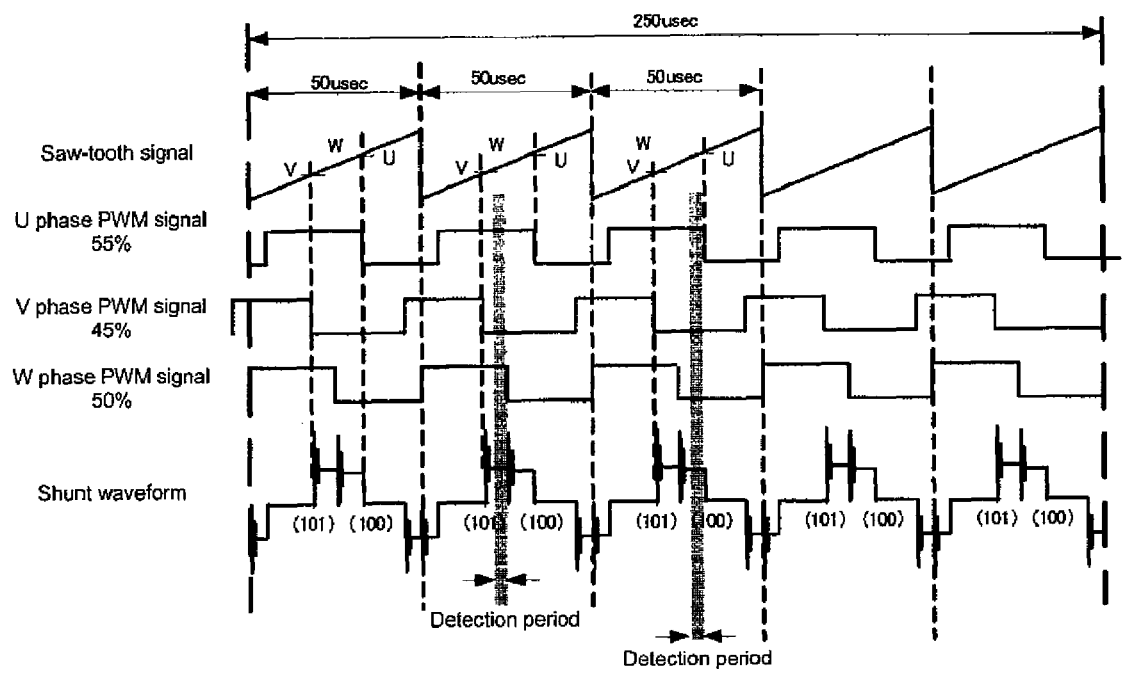
FIG. 9 shows a timing chart in a case where two phases in one control period are not detectable.

FIG. 9 shows a timing chart in a case where two phases are not detectable in one control period. One control period is 250 µs, and includes five periods of the PWM signal based on the saw-tooth signal of 50 µsec period. A case where the U phase PWM signal is duty 55%, the V phase PWM signal is duty 45%, and the W phase PWM signal is duty 50% is shown. The time interval between the V phase having duty minimum phase and the W phase having duty intermediate phase (vector in this case is (1, 0, 1)), and between the W phase of duty intermediate phase and the U phase having duty maximum phase (vector in this case is (1, 0, 0)) are both 5%, that is, short and thus the switching noise does not fall within the shunt waveform of the relevant period, and the A/D conversion time for accurately detecting the current value cannot be ensured. Thus, the PWM signal of the V phase having duty minimum phase is phase shifted to the left side (to advance phase), and the PWM signal of the U phase having the duty maximum phase is phase shifted to the right side (to delay the phase). The switching time intervals between the V phase and the W phase, and between the U phase and the W phase thus become large, and an accurate current value of the U phase and the V phase can be detected in the respective detection period.

Figure 10:
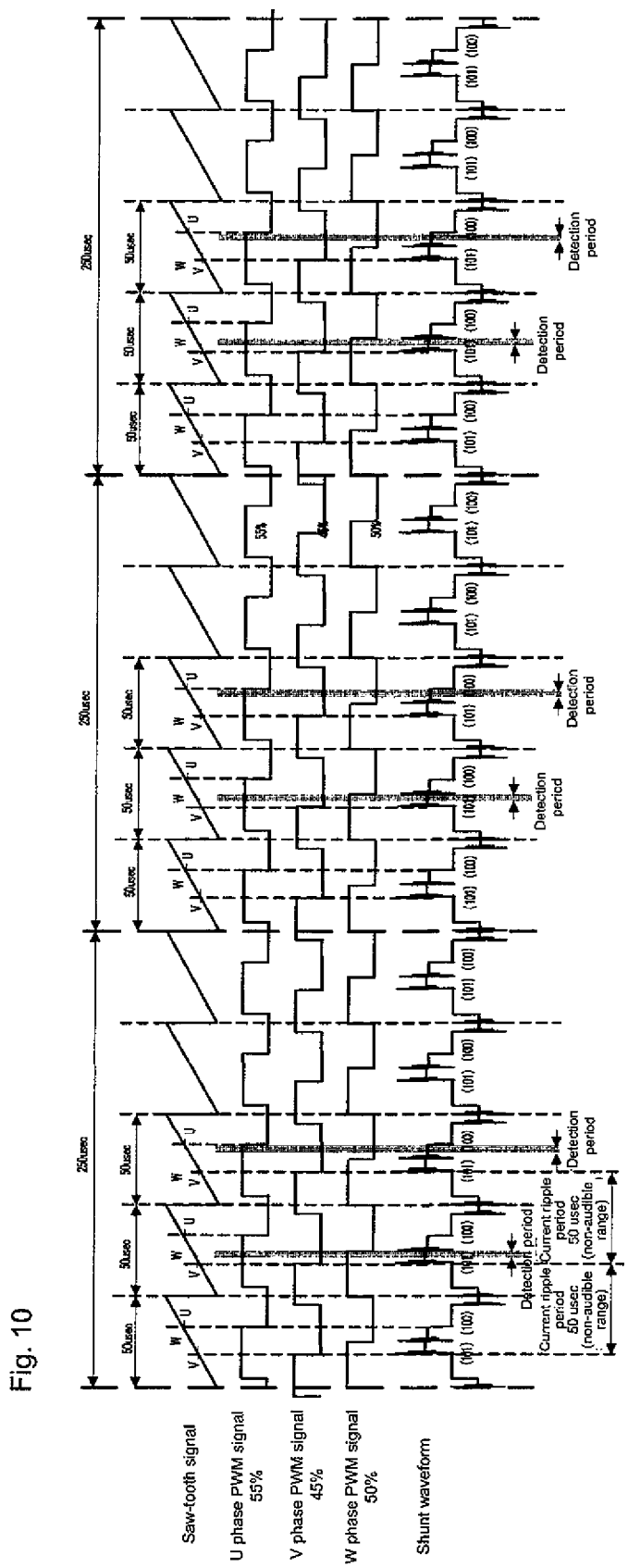
FIG. 10 shows a timing chart in a case where two phases in three control periods are not detectable.

FIG. 10 shows a timing chart in a case where two phases in three control periods are not detectable. As shown in FIGS. 9 and 10, the shift of the PWM signal of the V phase and the U phase is performed in all five periods of each control period, and thus the period of the current ripple represented by the shunt waveform is 50 µsec, similar to the carrier period of the saw-tooth signal, and the frequency corresponding to such a period is not included in the audible range. Therefore, generation of noise can be prevented.

A comparison regarding current ripple of the triangular signal and the saw-tooth signal is performed with respect to the carrier wave. The triangular signal has an advantage in that the current ripple is few compared to the saw-tooth signal. The reason is as described below. The PWM signal of one period is established from power running (when there is a difference in the ON/OFF state of each phase) and regeneration (when there is no difference in the ON/OFF state of each phase), but the current changes in the positive direction in power running. The current changes in the negative direction in regeneration. The slope of such change is determined by a time constant based on the inductance of the coil of the motor and the resistance of the coil of the motor.

Figure 11:
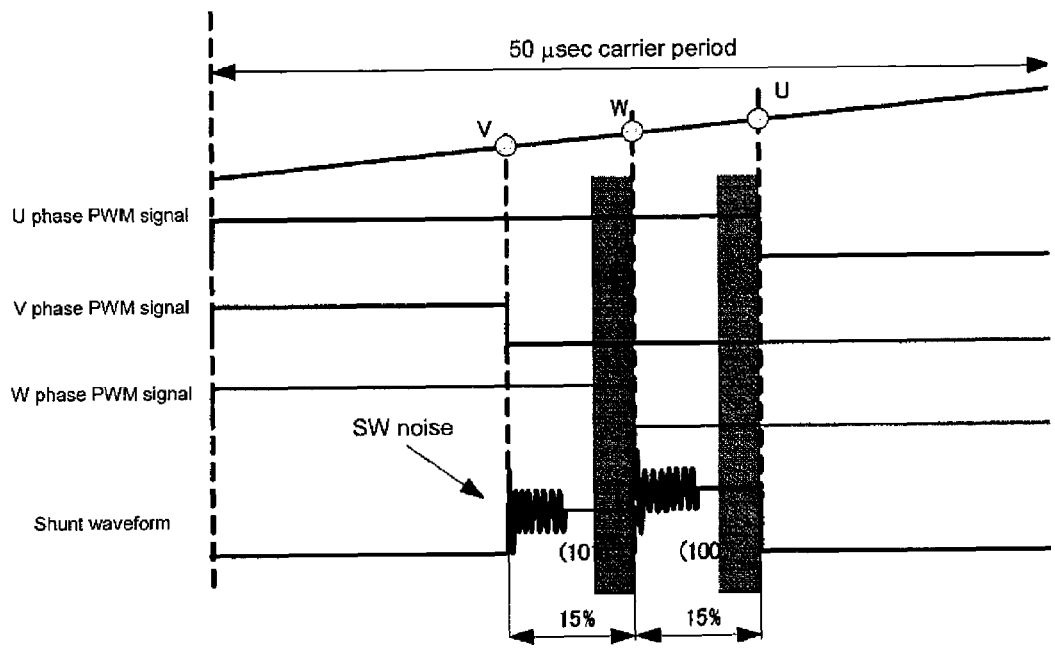
FIG. 11 shows a timing chart of the controller of the multi-phase electric motor according to the embodiment of the present invention.
Figure 12:
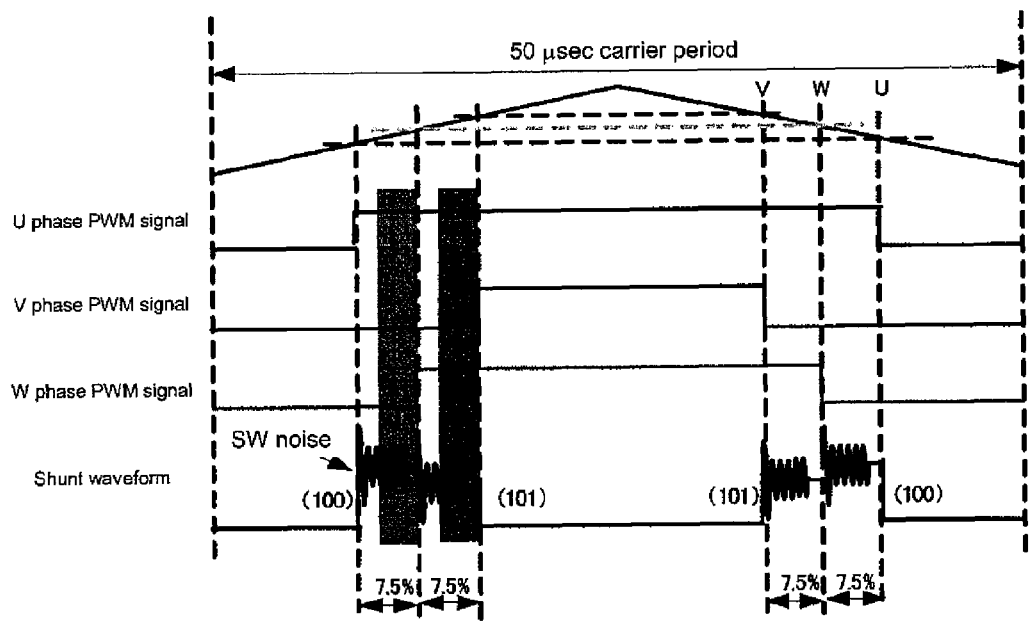
FIG. 12 shows a timing chart of the controller of the multi-phase electric motor when a triangular signal is used.

The current ripple generates when the state changes from power running to regeneration, or from regeneration to power running. The rise time of the PWM signal of each phase is the same in the saw-tooth signal. For instance, the state change of the power running and the regeneration in the saw-tooth signal of FIG. 11 is regeneration→power running→regeneration. The rise time of the PWM signal of each phase differs in the triangular signal. The state change of the power running and the regeneration in the triangular signal of FIG. 12 is regeneration→power running→regeneration→power running→regeneration. Thus, the number of changes of the current of one period is greater when using the triangular signal.

Thus, when the triangular signal is used, the number of changes in one period is large. Therefore, the amount of change to positive/negative is small, and the current ripple becomes small. When using the saw-tooth signal, the number of changes in one period is small, and the amount of change to positive/negative is large. In other words, the current ripple is large. However, if the phase shift is applied to one phase or two phases as in one or more embodiments of the present invention, a situation where the rise time of the PWM signal of each phase differs becomes greater even when the saw-tooth signal is used, and as a result, an advantage in that the current ripple becomes small is obtained.

Figure 13:
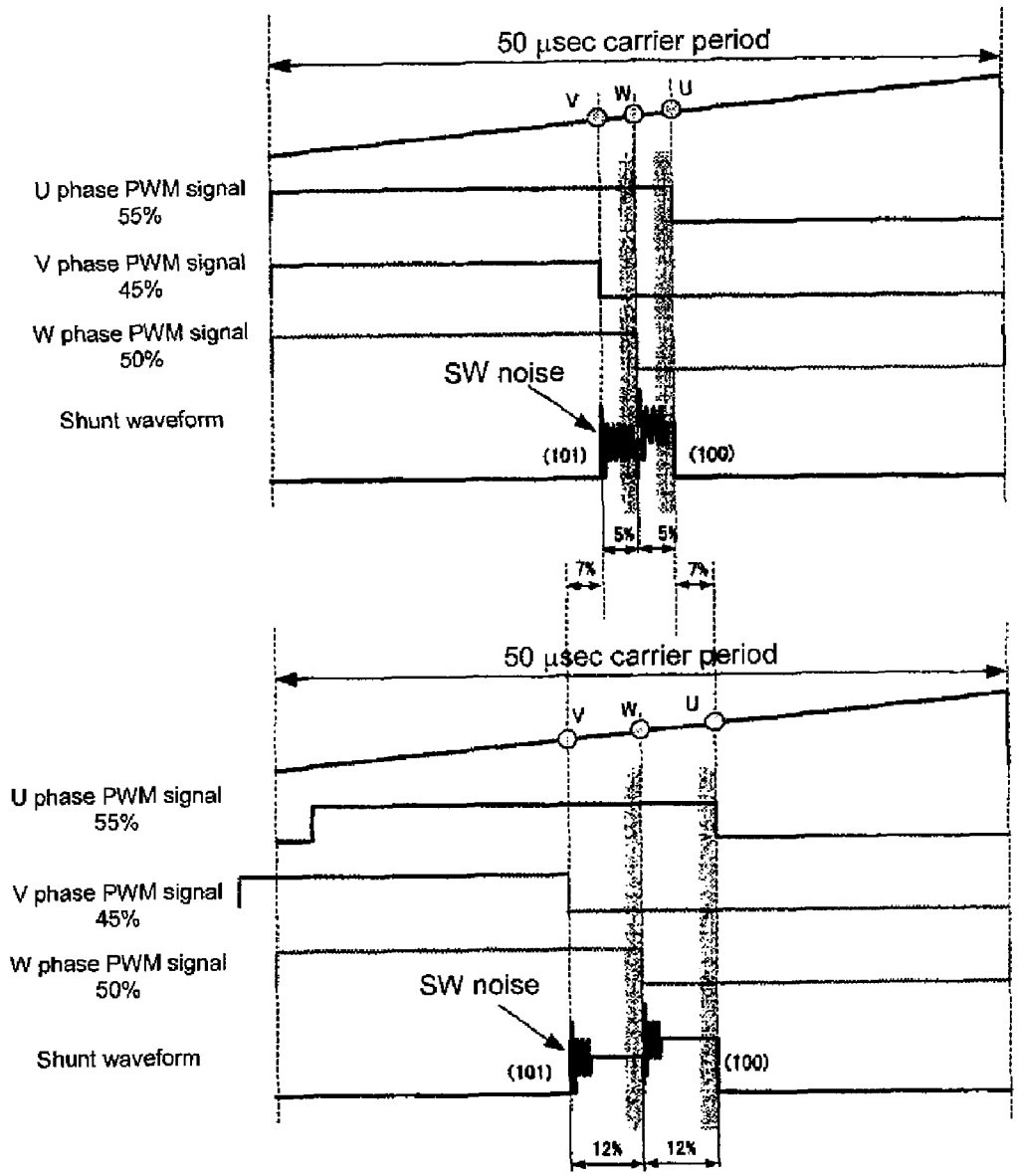
FIG. 13 shows a timing chart in a case where two phases are not detectable of the controller of the multi-phase electric motor according to the embodiment of the present invention.

FIG. 13 shows a timing chart of the controller of the multi-phase electric motor when the saw-tooth signal is used. A case where the U phase PWM signal is duty 55%, the V phase PWM signal is duty 45%, and the W phase PWM signal is duty 50% in the carrier period of 50 µsec is shown. The time intervals between the V phase and the W phase (vector in this case is (1, 0, 1)), and between the W phase and the U phase (vector in this case is (1, 0, 0)) are 5%, that is, short, and thus the switching noise does not fall within the shunt waveform of the relevant period, and the A/D conversion time for accurately detecting the current value cannot be ensured. The Duty difference (12%) necessary for detection can be ensured by shifting the U phase having the maximum duty to the right side by 7% and the V phase having the minimum duty to the left side by 7%.

Figure 14:
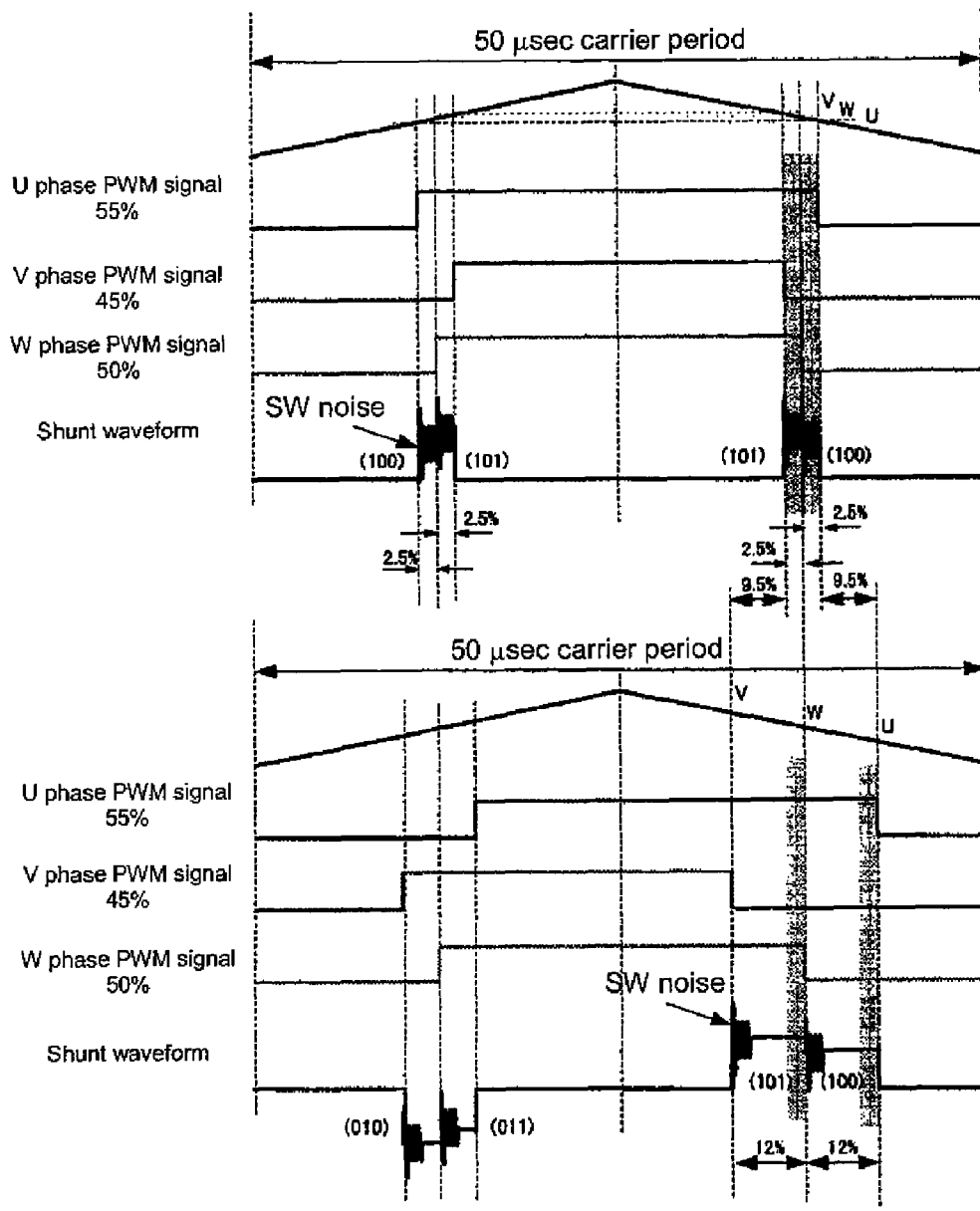
FIG. 14 shows a timing chart in a case where two phases are not detectable of the controller of the multi-phase electric motor when the triangular signal is used.
Figure 15:
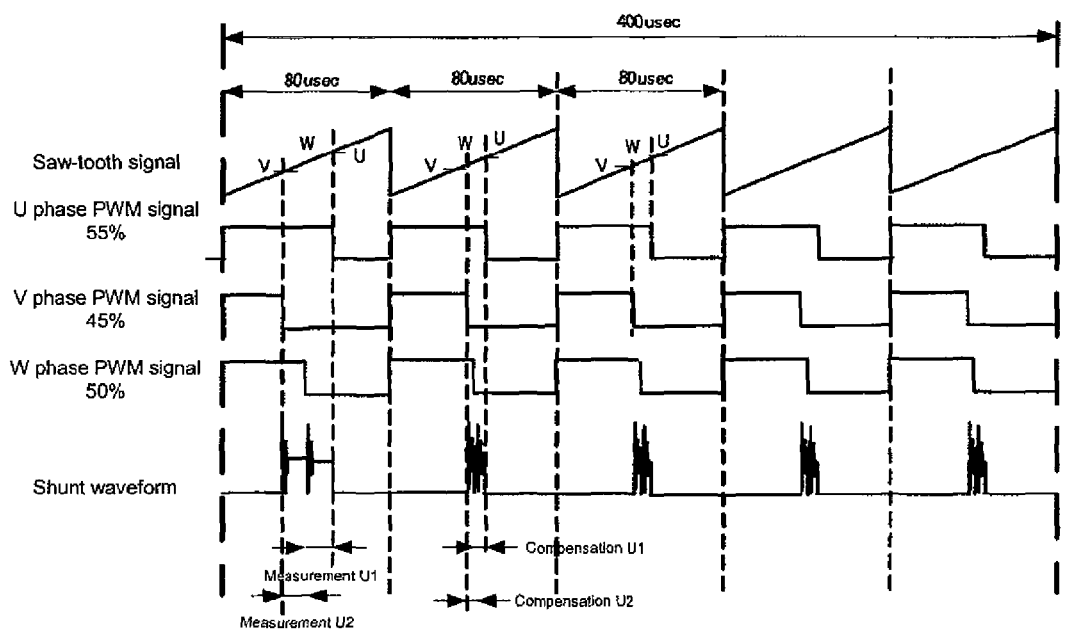
FIG. 15 shows a timing chart in a case where two phases in one control period are not detectable of the prior art.
Figure 16:
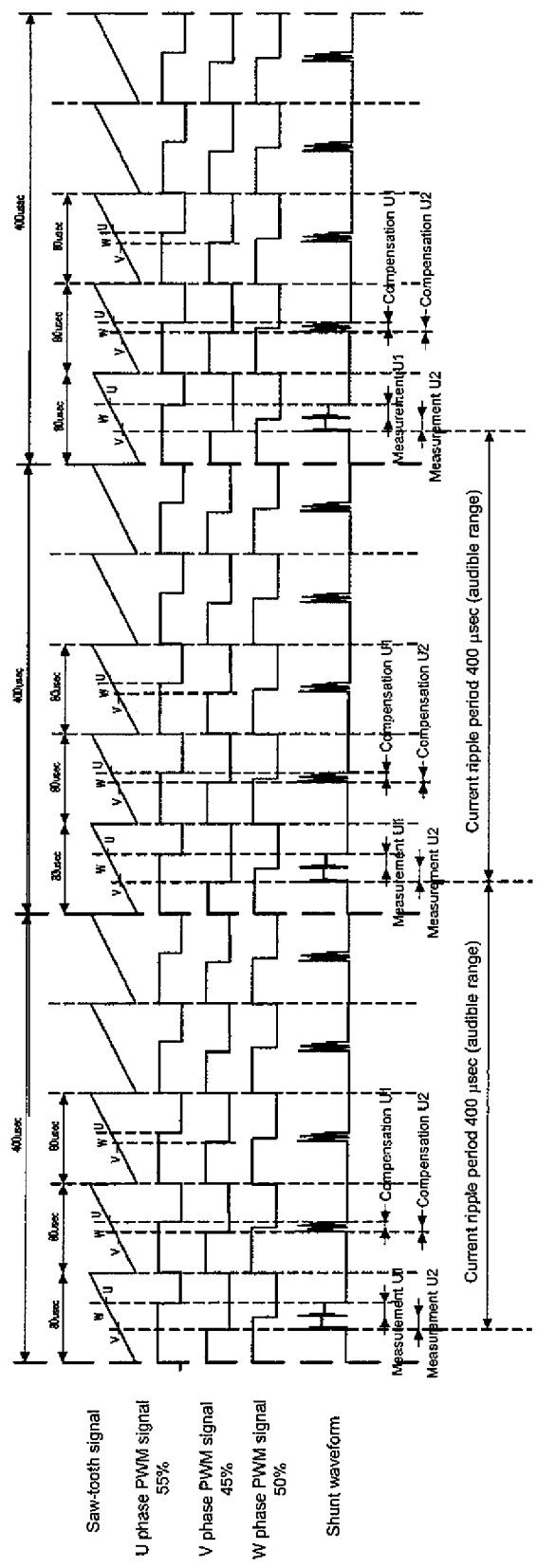
FIG. 16 shows a timing chart in a case where two phases in three control periods are not detectable in the prior art.

FIG. 14 shows a timing chart of the controller of the multi-phase electric motor when the triangular signal is used. Similar to when the saw-tooth signal is used, a case where the U phase PWM signal is duty 55%, the V phase PWM signal is duty 45%, and the W phase PWM signal is duty 50% in the carrier period of 50 µsec is shown. When the triangular wave is used, the time intervals between the V phase and the W phase (vector in this case is (1, 0, 1)), and between the W phase and the U phase (vector in this case is (1, 0, 0)) are both 2.5%, that is, short since a phase difference is created on both sides. Therefore, the Duty difference (12%) necessary for detection cannot be ensured unless the U phase having the maximum duty is shifted to the right side by 9.5% and the V phase having the minimum duty to the left side by 9.5%. Since the PWM signal is symmetric in the triangular signal, the Duty difference (12%) necessary for detection can be ensured even by similarly shifting the U phase having the maximum duty to the left side by 9.5% and the V phase having the minimum duty to the right side by 9.5%. However, it is disadvantageous in that the shift amount increases by 9.5%-7%=2.5% compared to the saw-tooth signal.

Therefore, when the carrier wave is the saw-tooth signal, the length between the switching of the two phases is doubled compared to when the carrier wave is the triangular wave. Thus, compared to the triangular signal, an advantage is obtained in that there exist numerous three-phase PWM states in which the A/D conversion can be performed with the voltage waveform at both ends of the shunt resistor stabilized without performing the phase shift of the PWM signal.

Even if the triangular signal is used, the A/D conversion is performed at optimum locations of the detectable timing at when the current of two phases, that is, the U phase, which is the Duty maximum phase, and the V phase, which is the Duty minimum phase, can be detected. For instance, when performing the A/D conversion in the second half of one period as in FIG. 14, in the case of the current detection of the Duty minimum V phase, the A/D conversion is performed in the period necessary for AND conversion immediately before the fall of the PWM signal of the Duty intermediate W phase during the first detection period (shaded portion on the left side). In the case of the current detection of the Duty maximum U phase, the A/D conversion is performed in the period necessary for AD conversion immediately before the fall of the PWM signal of the U phase during the second detection period (shaded portion on the right side). The phase shift of each phase is performed through similar method when performing the A/D conversion in the first half of the one period, and the current can be detected in the A/D converter, and thus the description will not be given.

Similar to the case of the saw-tooth signal, even if the triangular signal is used, the current value of each phase can be accurately detected for every control period using the single current detection section by shifting the PWM signal of each phase in the period of all five periods of each control period, and the frequency of the current ripple by switching based on the PWM signal is not included in the audible range, whereby the generation of noise can be prevented.

In the present invention, various embodiments other than the above may be adopted. For instance, the FET is used for the upper arm switching element and the lower arm switching element in the above embodiment, but other switching element such as IGBT (Insulated Gate Bipolar mode Transistor) may be used. Furthermore, the current detection section may adopt a configuration other than that shown in the embodiment, and may be arranged between the power supply and the FET bridge.

A brushless motor is described in the above embodiment as a multi-phase electric motor by way of example, but the present invention can be applied to the general controller for controlling the electric motor including a plurality of phases such as induction motor and synchronous motor.

What is claimed is:

1. A controller of a multi-phase electric motor comprising:
   a drive section, comprising an upper arm switching element and a lower arm switching element, for driving the multi-phase electric motor;
   a single current detection section for detecting a current value of the multi-phase electric motor;
   a pulse width modulation signal generation section for generating plural pulse width modulation signals of each phase for each of a plurality of pulse width modulation periods comprised by one control period based on the current value detected by the current detection section and a carrier signal;
   a current detectability determination section for determining whether the current value is detectable in the current detection section based on the pulse width modulation signal of each phase generated by the pulse width modulation signal generation section; and
   a phase movement section for moving a phase of the pulse width modulation signal of a predetermined phase generated by the pulse width modulation signal generation section,
   wherein the phase movement section moves the phase of the pulse width modulation signals of the predetermined phase within one control period by the same amount for all the plurality of pulse width modulation periods when the current detectability determination section determines that current is not detectable.

2. The controller of the multi-phase electric motor according to claim 1, further comprising:
   a switching number determination section for determining whether a number of the upper arm switching element to turn ON is an even number or an odd number when the current detectability determination section determines that current is not detectable,
   wherein the phase movement section moves the phase of the pulse width modulation signal of the predetermined phase generated by the pulse width modulation signal generation section based on the determination result of the switching number determination section.

* * * * *